United States Patent

Bostrom et al.

(10) Patent No.: US 7,717,459 B2
(45) Date of Patent: May 18, 2010

(54) AIRBAG ARRANGEMENT

(75) Inventors: Ola Bostrom, Alingsas (SE); Yngve Haland, Falsterbo (SE)

(73) Assignee: Autoliv Development AB, Vargarda (SE)

( * ) Notice: Subject to any disclaimer, the term of this patent is extended or adjusted under 35 U.S.C. 154(b) by 693 days.

(21) Appl. No.: 10/554,215

(22) PCT Filed: Apr. 15, 2004

(86) PCT No.: PCT/GB2004/001641

§ 371 (c)(1),
(2), (4) Date: Sep. 5, 2006

(87) PCT Pub. No.: WO2004/094199

PCT Pub. Date: Nov. 4, 2004

(65) Prior Publication Data

US 2007/0096444 A1    May 3, 2007

(30) Foreign Application Priority Data

Apr. 24, 2003 (EP) .................................. 03252579

(51) Int. Cl.
*B60R 21/16* (2006.01)
(52) U.S. Cl. .................. 280/730.1; 280/730.2; 280/735
(58) Field of Classification Search ............. 280/730.1, 280/730.2; 999/730.1, 730.2
See application file for complete search history.

(56) References Cited

U.S. PATENT DOCUMENTS

| | | | | |
|---|---|---|---|---|
| 3,791,667 A | * | 2/1974 | Haviland | ................. 280/730.2 |
| 5,072,966 A | * | 12/1991 | Nishitake et al. | ......... 280/730.2 |
| 5,172,790 A | * | 12/1992 | Ishikawa et al. | ............ 180/268 |
| 5,222,761 A | * | 6/1993 | Kaji et al. | ................ 280/730.2 |
| 5,499,840 A | | 3/1996 | Nakano | |
| 5,531,470 A | * | 7/1996 | Townsend | ................ 280/730.2 |
| 5,556,128 A | * | 9/1996 | Sinnhuber et al. | ........ 280/730.2 |
| 5,575,497 A | * | 11/1996 | Suyama et al. | ........... 280/730.1 |
| 6,123,357 A | * | 9/2000 | Hosoda et al. | ........... 280/730.2 |
| 6,371,513 B1 | | 4/2002 | Fujimoto et al. | |
| 2006/0119082 A1 | * | 6/2006 | Peng et al. | ................ 280/730.2 |

FOREIGN PATENT DOCUMENTS

| | | |
|---|---|---|
| DE | 93 15 509.3 | 3/1994 |
| DE | 100 26 340 C1 | 12/2001 |
| GB | 2 309 440 A | 7/1997 |
| JP | 2001-163162 | 6/2001 |
| WO | 01/49535 A1 | 7/2001 |

* cited by examiner

*Primary Examiner*—Toan C To
(74) *Attorney, Agent, or Firm*—Brinks Hofer Gilson & Lione

(57) ABSTRACT

An air-bag arrangement for a motor vehicle is disclosed to provide protection for the occupants (1, 2) of two adjacent seats (11, 12). Each seat is associated with two air-bag units (15, 16, 20, 21), one of which contains an air-bag to be deployed so as to occupy a space on the inboard side of the seat, and the other of which contains an air-bag to be deployed so as to occupy a space on the outboard side of the seat. There is a sensor and control arrangement (23) to sense impact and to determine which side of the vehicle has been impacted. The sensor and control arrangement (23) generates actuation signals capable of actuating the air-bag unit (15) associated with the first seat (11) closest to the point of impact I, and the air-bag unit (21) of the second seat (12) closest to the point of impact I.

14 Claims, 3 Drawing Sheets

AIRBAG ARRANGEMENT

CROSS REFERENCE TO RELATED APPLICATIONS

This application claims priority to European patent application 03252579.2, filed Apr. 24, 2003 and PCT/GB2004/001641, filed Apr. 15, 2004.

FIELD OF THE INVENTION

The present invention relates to an air-bag arrangement, and more particularly relates to an air-bag arrangement intended to provide protection for the occupants of a motor vehicle in the event that a side impact should occur.

BACKGROUND OF THE INVENTION

When a side impact occurs, from one side of the vehicle, the vehicle is given a very sudden acceleration. The effect is that, due to inertia, occupants of the vehicle tend to move towards the side of the vehicle where the impact occurs.

Typically a vehicle occupant is restrained by a three-point seat-belt. Typically a three-point seat-belt has a lap belt portion and a diagonal shoulder belt strap, the shoulder belt portion typically extending from a point adjacent the centre of the vehicle upwardly across the chest or torso of the occupant to a point on the adjacent "B"-Post of the vehicle for a front seat passenger and "C"-Post of the vehicle for a rear seat passenger.

In the case of a side impact for a vehicle occupant who is sitting adjacent the side of the vehicle where the impact occurs, the effect will be that the torso of the occupant will tend to move towards the side of the vehicle where the impact occurs. The shoulder of the occupant will thus be "caught" by the shoulder belt portion and the occupant will be restrained. However, for a seat occupant sitting on the side of the vehicle furthest from the side impact, the torso of the occupant will tend to move away from the adjacent "B"-Post, and will not be restrained to a substantial extent by the shoulder belt strap.

SUMMARY OF THE INVENTION

The present invention seeks to provide an improved air-bag arrangement.

According to the present invention, there is provided an air-bag arrangement in a motor vehicle to provide protection for the occupant of at least one seat, the seat being associated with two side impact air-bag units, one air-bag unit containing an air-bag to be deployed to occupy a space on the inboard side of the seat (closest to the center of the vehicle) and the other air-bag unit containing an air-bag to be deployed to occupy a space on the outboard side of the seat (nearest the vehicle door), there being a sensor and control arrangement to sense a side impact and to determine which side of the vehicle has been impacted, and to generate actuation signals capable of actuating only the air-bag unit closest to the point of impact.

Preferably, the side impact air-bag arrangement is configured to provide protection for the occupants of two seats arranged adjacent one another, wherein the sensor and control arrangement is configured to generate actuation signals capable of actuating only the side impact air-bag unit associated with the first seat closest to the point of impact, and only the air-bag unit of the second seat closest to the point of impact.

Preferably, at least one seat is provided with a sensor to sense the presence of an occupant in the seat, the sensor enabling actuation of the air-bag units associated with that seat in response to the actuation signal from the sensor and control unit.

Advantageously, at least one air-bag unit for the seat is mounted in the back-rest of the seat.

Conveniently, one unit in the seat is on the inboard side of the seat.

Preferably, both air-bag units associated with the seat are mounted in the back-rest of the seat.

Advantageously, at least one air-bag unit associated with a seat is mounted in an adjacent pillar of the motor vehicle.

Conveniently, the air-bag arrangement of this invention is used with a seat also provided with a three-point safety-belt.

Preferably, the air-bag arrangement of this invention is used with a seat-belt also provided with a pretensioner.

Advantageously, the inboard side of the seat is associated with a support element, the support element being configured to extend inboard of the inflated inboard air-bag so as to provide lateral support to at least part of the inflated air-bag.

Conveniently, the support element is mounted in or on the same seat as the inboard air-bag that it supports.

Preferably, said support element is moveable upon actuation of the air-bag on the inboard side of the seat, from an initial position to an operative position, the airbag being configured to extend to an operative position, the support element being configured to extend inboard of the inflated air-bag when in the operative position.

Conveniently the support element is resiliently deformable and configured, when in said operative position, to yield under a force exerted thereon by the weight of an occupant of the seat in a crash, thereby absorbing energy.

Preferably the support element is configured to move from the initial position to the operative position in a generally forwards direction relative to the back-rest.

BRIEF DESCRIPTION OF THE DRAWINGS

In order that the invention may be more readily understood, and so that further features thereof may be appreciated, embodiments of the invention will now be described, by way of example, with reference to the accompanying drawings in which.

DETAILED DESCRIPTION OF THE INVENTION

Figure 1:
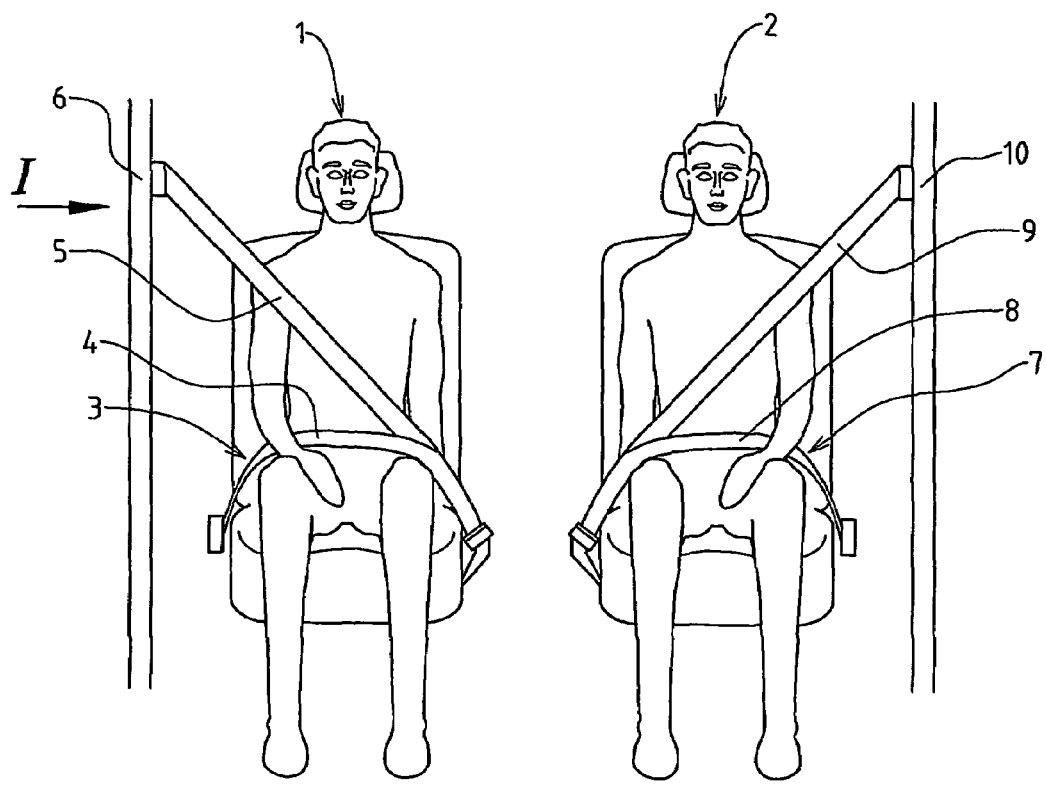
FIG. 1 is a diagrammatic view illustrating two adjacent occupants of a vehicle.

Referring initially to FIG. 1 of the accompanying drawings, two occupants 1, 2 are illustrated seated in the front seats of a motor vehicle. The first occupant 1 is restrained by a three-point seat-belt 3 which includes a lap strap 4 and a diagonal chest or torso strap 5 (shoulder belt) which extends to an anchoring point, typically in the form of a pillar-loop adjuster, mounted on the adjacent B-Post 6 of the vehicle. Similarly the second occupant, 2 is restrained by a seat-belt 7 which includes a lap strap 8, and a diagonal chest strap 9 (or shoulder belt) which extends across the chest or torso of the occupant to an anchoring point, again typically in the form of a pillar-loop adjuster, provided on opposite the "B"-Post 10 of the vehicle.

It is to be appreciated that if the vehicle is involved in a side impact, as indicated by the arrow 1, which might be caused by another vehicle hitting the side of the vehicle in question adjacent the first occupant 1, the vehicle will be given a very substantial sideways acceleration. The effect will be that, due to inertia, the occupant 1 will tend to move towards the adjacent "B"-Post 6. The occupant 1 will be restrained by the diagonal belt portion 5. However, the second occupant 2 will also move towards the "B"-Post 6 adjacent the first occupant 1. The second occupant 2 will thus not be restrained effectively by his or her seat-belt.

Figure 2:
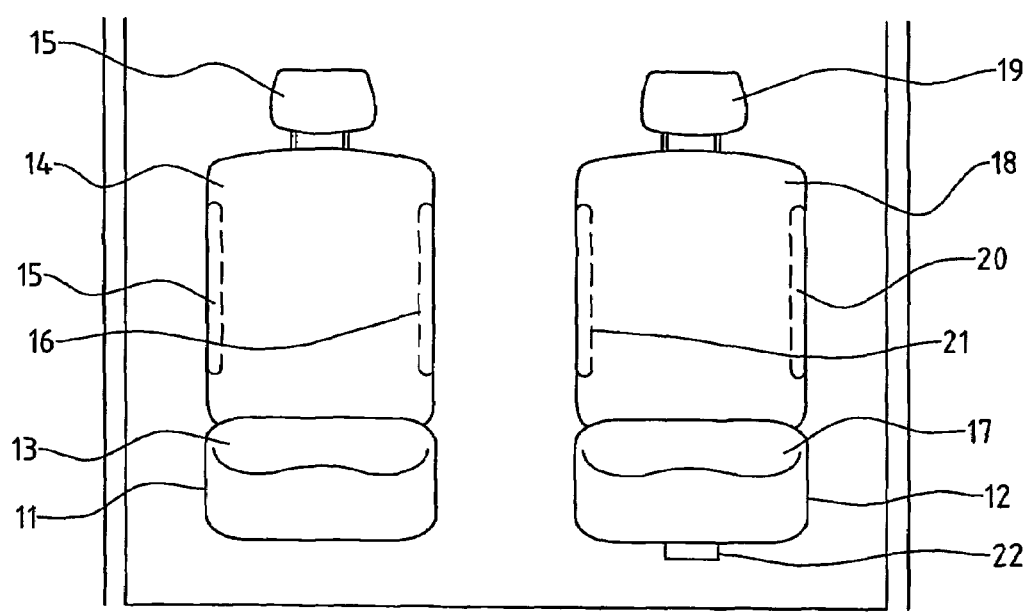
FIG. 2 is a view of a first embodiment of the invention showing side impact air-bag units mounted in adjacent seats in a motor vehicle.

Referring now to FIG. 2, two vehicle seats 11, 12 are shown schematically. The seat 11 has a squab or cushion 13, a back-rest 14 with a head-rest. On the outboard side of the back-rest there is provided an air-bag unit 15. The air-bag unit 15 is such that, on deployment of the air-bag, the air-bag itself extends outwardly from the back-rest 14 and forwardly so that the main part of the air-bag lies adjacent a chest or torso of the seat occupant. Air-bags of this type are known per se. Mounted on the inboard side of the seat 11 is a second air-bag unit 16. Again this air-bag unit is equivalent to the air-bag unit 15.

The adjacent seat 12 is of a similar design having a squab or cushion 17, a back-rest 18 and a head-rest 19, and having two air-bag units 20 and 21 of the type discussed above.

The seat 11 is for use by the driver of the vehicle, and the seat 12 is for use by a front seat passenger. The seat 12 is provided with a sensor 22 to sense whether the seat is occupied or not. An impact sensor and control unit 23 is provided to sense a side impact and to deploy the air-bags appropriately.

Figure 3:
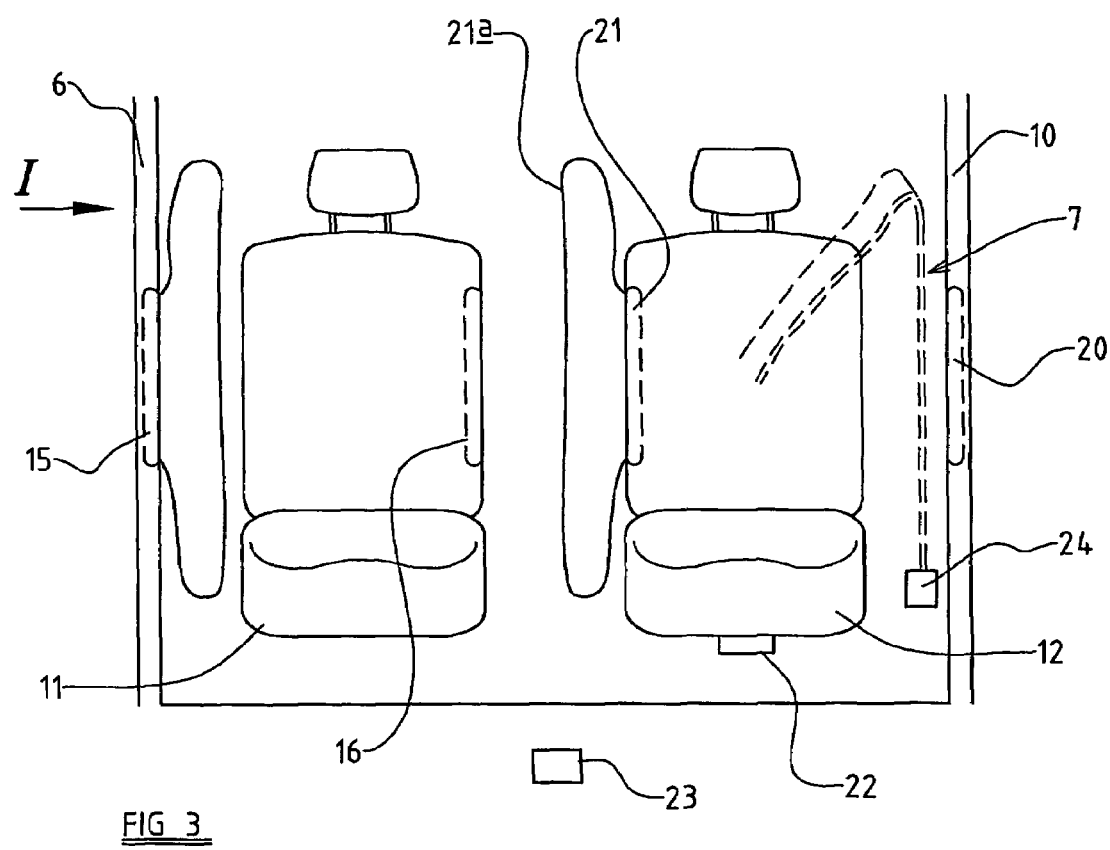
FIG. 3 is a view of a modified embodiment of the invention illustrating air-bag units mounted in the seats of the vehicle, and mounted in the vehicle itself, with certain of the air-bags being shown in the inflated condition.

Referring now to FIG. 3, a modified embodiment of the invention is illustrated. In this embodiment of the invention the outboard air-bag units 15 and 20 are not mounted in the back-rests of the appropriate seats, but instead are mounted in the adjacent "B"-Posts of the vehicle. In all other respects the embodiment of FIG. 3 is the same as the embodiment of FIG. 2. Referring to FIG. 3, it is to be understood that the vehicle illustrated has been subjected to a side impact on the driver's side of the vehicle, adjacent the seat 11. The impact is indicated by the arrow 1, as in FIG. 1.

As a consequence of the sensed side impact, the sensor and control unit 23 has only deployed the air-bag unit 15 on the outboard side of the driver's seat 11, that is to say the air-bag unit 15 and not the air-bag of the air-bag unit 16 on the inboard side of the driver's seat 11. Air-bag 15 thus provides a protective cushion located between the driver of the vehicle and the impact.

As shown in FIG. 3, the sensor 22 sensed that the seat 12 is occupied, and consequently has caused only the inboard air-bag unit 21, and not the outboard air-bag unit 20, to be actuated so that an air-bag is provided between the second seat occupant 2 and the side of the vehicle where the impact is occurring. The occupant 2 of the seat 12 will therefore be restrained from moving towards the "B"-Post 6 by means of the inflated air-bag from the air-bag unit 21 and, should any "rebound" occur will be restrained from moving towards the "B"-Post 10 by the three-point seat-belt 7 as shown in FIG. 1.

It is therefore to be appreciated that in accordance with the present invention not all of the air-bags are deployed during a side impact, but only the air-bag of each seat which is located between an occupant of the respective seat and the area of side impact, i.e. those air-bags which act to protect the occupants of the vehicle from the impact.

It is to be understood that if the sensor 22 did not sense that the seat 12 was occupied, or only sensed that the seat was occupied by a child seat, then the air-bag unit 21 would not be actuated by the sensor and control unit 23.

Of course, if the impact had occurred in the opposite sense, that is to say on the side of the vehicle adjacent the seat 12, then the air-bag units 16 and 20 would be deployed, again assuming that both seats were occupied.

Whilst the invention has been described with reference to two specific embodiments, it is to be appreciated that many modifications may be effected. The air-bag units associated with each seat may take many different designs. Whilst reference has been made to air-bag units mounted in the seat back and air-bag units mounted in the adjacent "B"-Pillar, it is to be appreciated that one of the air-bag units could be in the form of an inflatable curtain. Such an inflatable curtain, when inflated, occupies space between a seat occupant and the adjacent side of the vehicle, but, most importantly, occupies space immediately adjacent the seat to provide protection for the occupant.

Whilst reference has been made to a sensor 22 for sensing whether the seat 12 is occupied or not, any form of sensor may be utilised. FIGS. 2 and 3 illustrate a sensor mounted in the squab of the seat. However, an optical sensor or some other remote sensor such as a radar sensor may be utilised.

In certain embodiments of the invention it has been found beneficial to pretension the safety-belt of the seat occupant who is seated furthest from the side impact. Thus, in a preferred embodiment of the invention, three-point seat-belts are provided. FIG. 3 shows part of the three-point seat-belt 7 described primarily with reference to FIG. 1, in phantom, showing how the seat-belt 7 is provided with a retractor unit 24. The retractor unit 24 incorporates a pretensioner. Thus, during an impact situation, the sensor and control unit 23 may actuate the pretensioner in the retractor 24, and also may actuate a pretensioner at a corresponding retractor provided for the seat-belt 3 associated with the seat 11. It may be preferable for both seat-belts to be pre-tensioned in a side impact situation, but it has been found most preferable and most important for the seat-belt of the seat remote from the point of impact to be pretensioned.

If a child seat is detected on the seat, the sensor and control unit 23 may, in a side impact, actuate the appropriate pretensioner, thus tensioning the safety-belt that is holding the child seat in position, whilst not actuating the relevant air-bag unit.

Figure 4:
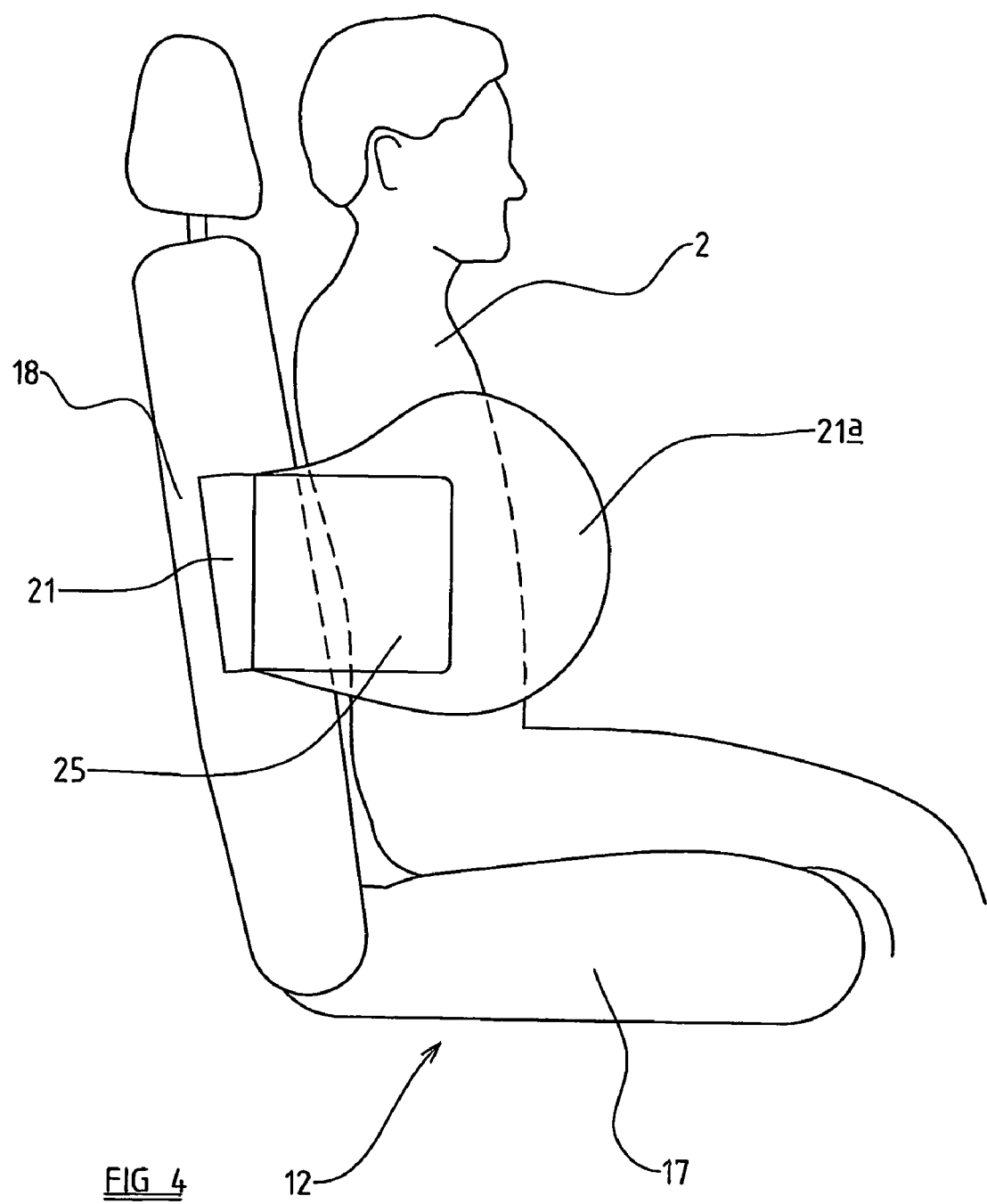
FIG. 4 is a side view of one of the vehicle seats illustrated in FIG. 2, illustrating a deployed air-bag with an associated element.

FIG. 4 illustrates the vehicle seat 12 of FIGS. 2 and 3, with the inboard air-bag unit 21 having been actuated so that the air-bag 21A has been inflated.

As illustrated in FIG. 4, the inboard air-bag unit 21 of the vehicle seat 12 is provided with a support element 25 which is shown in an actuated condition in which it extends forwardly from the back-rest 18, on the inboard side of the inflated air-bag 21A such that the air-bag 21A extends between the support element 25 and the thorax of the seat occupant 2. The support element 25, in this deployed condition, serves to provide lateral support to the inflated air-bag 21A so as to hold it in a position effective to provide lateral protection to the thorax of the seat occupant 2 in the event of a side impact. It has been found desirable to provide this support element 25 because otherwise, the deployed inboard air-bag 21 may not provide adequate support to the seat occupant 2 in the absence of any other vehicle structure, or an adjacent inflated air-bag.

The support element 25 is, as illustrated above, illustrated in FIG. 4 in an operative, deployed position. However, prior to actuation of the air-bag 21A, the support element 25 adopts an initial position in which it is allocated substantially within the back-rest 18. Upon actuation of the air-bag 21A, the support element 25 is configured to move from its initial position within the back-rest 18 to the deployed position illustrated in FIG. 4, for example in a generally forwards direction relative to the back-rest 18. In a preferred arrangement, the support element 25 is resiliently deformable and is configured, when in its deployed position, to yield under a force exerted on it under the weight of the occupant 2 of the seat 12 in a crash, so as to absorb energy.

Of course, it is to be appreciated that the other vehicle seat 11, is also preferably provided with a support element similar to that described above, in order to provide lateral support to the inboard air-bag of that seat.

It is also to be appreciated that the support element could take other convenient forms such as, for example, a frame extending forwardly from the backrest of the seat, or possibly as at least part of a forwardly extending arm rest. It is not essential for the support element to move forwardly and indeed the support element could be permanently secured in its operative position. It is further to be appreciated that the support element need not be mounted to the same seat as the inboard air-bag which it supports, but may be associated with the inboard air-bag by being mounted to the adjacent seat or part of the structure of the vehicle.

While the above description constitutes the preferred embodiment of the present invention, it will be appreciated that the invention is susceptible to modification, variation and change without departing from the proper scope and fair meaning of the accompanying claims.

The invention claimed is:

1. An air-bag arrangement in a motor vehicle having at least a first vehicle seat and a second vehicle seat positioned adjacent one another to provide side-impact protection for an occupant of one of the vehicle seats, the air-bag arrangement comprising: two air-bag units provided for each of at least the one of the vehicle seats; the two air-bag units including a first air-bag unit containing an inboard air-bag to be deployed to occupy a space on an inboard side of the one of the vehicle seats and a second air-bag unit containing an outboard air-bag to be deployed to occupy a space on an outboard side of the one of the vehicle seats, a sensor and control arrangement operably connected to the first and second air-bag units for deployment of the first and second air-bag, the sensor and control arrangement configured to sense a side impact of the vehicle and to determine which side of the vehicle has been impacted, and to generate actuation signals such that only one of the first and second air-bag units that is closest to the point of impact is actuated.

2. An air-bag arrangement according to claim 1 wherein both the first and second vehicle seats each have the two air-bag units, the sensor and control arrangement is configured to generate actuation signals such that only the one of the first and second air-bag units closest to the point of impact for each of the vehicle seats is actuated.

3. An air-bag arrangement according to claim 1 wherein at least one of the first and second vehicle seats is provided with a sensor to sense the presence of the occupant in the vehicle seat, the sensor enabling actuation of at least one of the first and second air-bag units associated with the vehicle seat in response to the actuation signals from the sensor and control arrangement.

4. An air-bag arrangement according to claim 1 wherein at least one of the first and second air-bag units is mounted in a back-rest of the one of the vehicle seats.

5. An air-bag arrangement according to claim 4 wherein the first air-bag unit is mounted in the back-rest of the one of the vehicle seats and is on the inboard side of the one of the vehicle seats.

6. An air-bag arrangement according to claim 4 wherein both the first and second air-bag units are mounted in the back-rest of the one of the vehicle seats.

7. An air-bag arrangement according to claim 1 wherein at least one of the first and second air-bag units is mounted in an adjacent pillar of the motor vehicle.

8. An air-bag arrangement according to claim 1 wherein at least one of the first and second vehicle seats is provided with a three-point safety-belt.

9. An air-bag arrangement according to claim 8 wherein the three-point safety-belt is provided with a pretensioner.

10. An air-bag arrangement according to claim 1 wherein the inboard side of the one of the vehicle seats is associated with a support element, the support element being configured to extend inboard of the inflated inboard air-bag of the first air-bag unit so as to provide lateral support to at least part of the inflated inboard air-bag.

11. An air-bag arrangement according to claim 10 wherein the support element is mounted to the same vehicle seat as the inboard air-bag that it supports.

12. An air-bag arrangement according to claim 10 wherein the support element is moveable relative to the one of the vehicle seats upon actuation of the inboard air-bag from an initial position to a first operative position, the inboard airbag being configured to extend to a second operative position when deployed, the support element in the first operative position extending inboard of the inboard airbag when deployed to the second operative position.

13. An air-bag arrangement according to claim 12 wherein the support element is resiliently deformable and configured, when in the first operative position, to yield relative to the one of the vehicle seats under a force exerted thereon by the weight of the occupant of the one of the vehicle seats during the side impact, thereby absorbing energy.

14. An air-bag arrangement according to claim 12 wherein the support element is configured to move from the initial position to the first operative position in a generally forward direction relative to a back-rest of the one of the vehicle seats.

* * * * *